US012601927B2

(12) United States Patent
Jiao

(10) Patent No.: US 12,601,927 B2
(45) Date of Patent: Apr. 14, 2026

(54) TELESCOPE WITH ANTI-SHAKE MECHANISM

(71) Applicant: Chengdu Dinxin Precision Control Tech Co., Ltd., Chengdu (CN)

(72) Inventor: Zhitao Jiao, Chengdu (CN)

(73) Assignee: Chengdu Dinxin Precision Control Tech Co., Ltd., Chengdu (CN)

( * ) Notice: Subject to any disclaimer, the term of this patent is extended or adjusted under 35 U.S.C. 154(b) by 0 days.

(21) Appl. No.: 19/220,150

(22) Filed: May 28, 2025

(65) Prior Publication Data

US 2025/0306391 A1     Oct. 2, 2025

(30) Foreign Application Priority Data

Mar. 29, 2024    (CN) .......................... 202420643584.3
Feb. 17, 2025    (CN) .......................... 202520246555.8

(51) Int. Cl.
G02B 27/64        (2006.01)
G02B 23/02        (2006.01)

(52) U.S. Cl.
CPC ........... G02B 27/646 (2013.01); G02B 23/02 (2013.01)

(58) Field of Classification Search
CPC ........ G02B 23/00; G02B 23/02; G02B 23/08; G02B 23/12; G02B 23/125; G02B 23/14; G02B 23/16; G02B 23/165; G02B 23/18; G02B 23/24; G02B 23/2476; G02B 27/64; G02B 27/642; G02B 27/644; G02B 27/646; G02B 27/648

See application file for complete search history.

(56) References Cited

U.S. PATENT DOCUMENTS 9,417,458 B2 *   8/2016   Ando ................... G02B 27/646
12,399,378 B1 *   8/2025   Jiao ........................ G02B 23/02

FOREIGN PATENT DOCUMENTS

CN          220305562 U   *   1/2024

* cited by examiner

*Primary Examiner* — Thong Q Nguyen
(74) *Attorney, Agent, or Firm* — Hemisphere Law, PLLC

(57)        ABSTRACT

A telescope with an anti-shake mechanism is provided, including an eyepiece, an objective lens, a sensing assembly, a driving assembly and a prism compartment positioned between the eyepiece and the objective lens. An interior of the prism compartment is provided with a prism bracket and a prism disposed on the prism bracket. The prism bracket includes a rotation frame, an inner rotation frame rotatably connected to the rotation frame, a control circuit board, and an inner shaft circuit board disposed on the inner rotation frame. The rotation frame is rotatably connected to a supporting shaft mount disposed within the prism compartment. The control circuit board is electrically connected to the inner shaft circuit board. The sensing assembly includes an outer Hall element, a sensing magnetic steel and an inner Hall element. The driving assembly includes an outer driving coil, a driving magnetic steel, and an inner driving coil.

10 Claims, 4 Drawing Sheets

TELESCOPE WITH ANTI-SHAKE MECHANISM

TECHNICAL FIELD

The disclosure relates to the field of telescope anti-shake technologies, and more particularly to a telescope with an anti-shake mechanism.

BACKGROUND

Even a slight shake of a telescope during use can cause a sharp shaking of a field-of-view, making it hard to observe detailed targets. Currently, shake information of the telescope and deflection information of a prism are detected by a gyroscope sensor and a Hall element in the related art. Based on the detected information, magnetic steels are driven to move and to adjust the prism to deflect, countering shake effects of the telescope to the field-of-view.

However, the Applicant found that using a single magnetic steel for two-direction prism driving and position detection raises an output noise of the Hall element, reducing the anti-shake accuracy of a prism gimbal assembly.

SUMMARY

The disclosure provides a telescope with an anti-shake mechanism, aiming to solve problems that a single magnetic steel in the related art causes an output noise of a Hall element to increase and reduces an anti-shake accuracy of a prism gimbal assembly.

The disclosure is realized as follows. The telescope with the anti-shake mechanism includes: an eyepiece, an objective lens, a prism compartment positioned between the eyepiece and the objective lens, a sensing assembly, and a driving assembly.

An interior of the prism compartment is provided with a prism bracket and a prism disposed on the prism bracket.

The prism bracket includes a rotation frame, an inner rotation frame rotatably connected to the rotation frame, a control circuit board and an inner shaft circuit board disposed on the inner rotation frame. The rotation frame is rotatably connected to a supporting shaft mount disposed within the prism compartment. The control circuit board is electrically connected to the inner shaft circuit board.

The sensing assembly includes an outer Hall element disposed on the control circuit board, a sensing magnetic steel disposed on the rotation frame, and an inner Hall element disposed on the inner shaft circuit board. The driving assembly includes an outer driving coil disposed on the control circuit board, a driving magnetic steel disposed on the rotation frame, and an inner driving coil disposed on the inner shaft circuit board.

In an embodiment, a rotation shaft is disposed on the rotation frame, the rotation shaft is assembled and connected to the supporting shaft mount within the prism compartment. A bearing housing is disposed on a top of the rotation frame, a top shaft is disposed on the control circuit board, and the top shaft is assembled in the bearing housing.

In an embodiment, bearing installation grooves are defined on a side wall of the rotation frame, an outer side of the inner rotation frame is provided with pitch shafts, the pitch shafts are provided with pitch bearings respectively, and each pitch bearing is engaged in each bearing installation groove.

In an embodiment, the outer driving coil and the driving magnetic steel cooperate with each other to drive the rotation frame to cause horizontal deflection, and the driving magnetic steel and the inner driving coil cooperate with each other to drive the inner rotation frame to cause pitch deflection.

In an embodiment, the outer Hall element, the sensing magnetic steel, and the inner Hall element are arranged correspondingly, the outer Hall element and the sensing magnetic steel are configured to obtain a horizontal deflection angle of the rotation frame, and the sensing magnetic steel and the inner Hall element are configured to obtain a pitch deflection angle of the inner rotation frame.

In an embodiment, rotation directions of the rotation frame and the inner rotation frame are perpendicular to each other.

In an embodiment, the control circuit board is provided with a gyroscope.

In an embodiment, the inner rotation frame is defined with a prism cavity, and the prism is disposed within the prism cavity.

In an embodiment, the control circuit board and the inner shaft circuit board are connected by a flexible flat cable.

In an embodiment, a battery holder is disposed within the prism compartment, the battery holder is electrically connected to the control circuit board.

Compared to the related art, the embodiments of the disclosure have advantageous effects as follows.

The telescope with the anti-shake mechanism provided by the disclosure can achieve rotation adjustments of the inner rotation frame and the rotation frame through interactions of the driving assembly. The sensing assembly can obtain actual deflection angles of the rotation frame and the inner rotation frame. The sensing assembly and the driving assembly individually use an independent magnetic steel. By using the inner rotation frame and the rotation frame to adjust the prism through horizontal rotations and pitch rotations respectively, mutual interferences of the signals can be minimized, the output noise of the Hall element can be reduced, and an anti-shake accuracy of a device can be improved.

DESCRIPTION OF REFERENCE SIGNS

10—eyepiece; 20—objective lens; 30—prism compartment; 310—battery holder; 320—supporting shaft mount;

40—prism bracket; 410—control circuit board; 411—outer driving coil; 412—outer Hall element; 413—top shaft; 414—gyroscope; 420—inner shaft circuit board; 421—inner driving coil; 422—inner Hall element; 430—rotation frame; 431—prism cavity; 432—bearing installation groove; 433—driving magnetic steel; 434—bearing housing; 435—sensing magnetic steel; 436—rotation shaft; 440—inner rotation frame; 441—pitch shaft; 442—pitch bearing; 450—flexible flat cable; 500—prism.

DETAILED DESCRIPTION OF EMBODIMENTS

Unless otherwise defined, all technical and scientific terms used herein have the same meanings as commonly understood by those skilled in the art of the disclosure. The terms used in a specification of the disclosure are for the purpose of illustrating specific embodiments and are not intended to limit the disclosure. The terms "include" and "have", as well as their any variations used in the specification and claims of the disclosure and the above-mentioned illustration of attached drawings, are intended to cover non-exclusive inclusions. The terms "first", "second", etc., used in the specification and claims of the disclosure and the above-mentioned illustration of the attached drawings are for distinguishing different objects and are not for illustrating particular orders.

Reference to "embodiment" in the disclosure means that particular features, structures, or characteristics illustrated in conjunction with the embodiments may be included in at least one embodiment of the disclosure. The phrase appearing at various places in the specification does not necessarily refer to the same embodiment, nor is it an embodiment exclusive of or alternatives to other embodiments. It is implicitly and explicitly understood by those skilled in the art that the embodiments illustrated herein may be combined with other embodiments.

Figure 1:
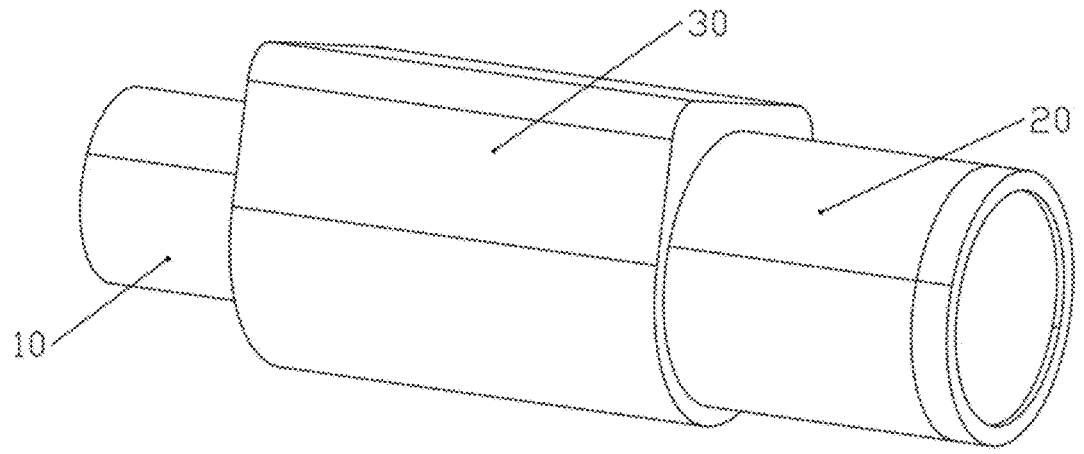
FIG. 1 illustrates a schematic structural view of a telescope with an anti-shake mechanism of the disclosure.
Figure 2:
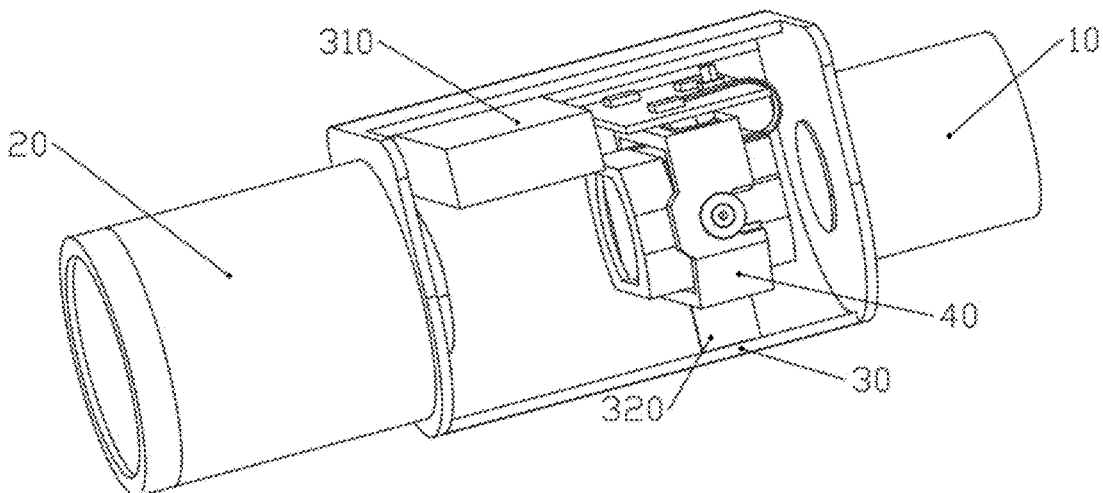
FIG. 2 illustrates a schematic structural view of an internal structure of the telescope with the anti-shake mechanism of the disclosure.
Figure 3:
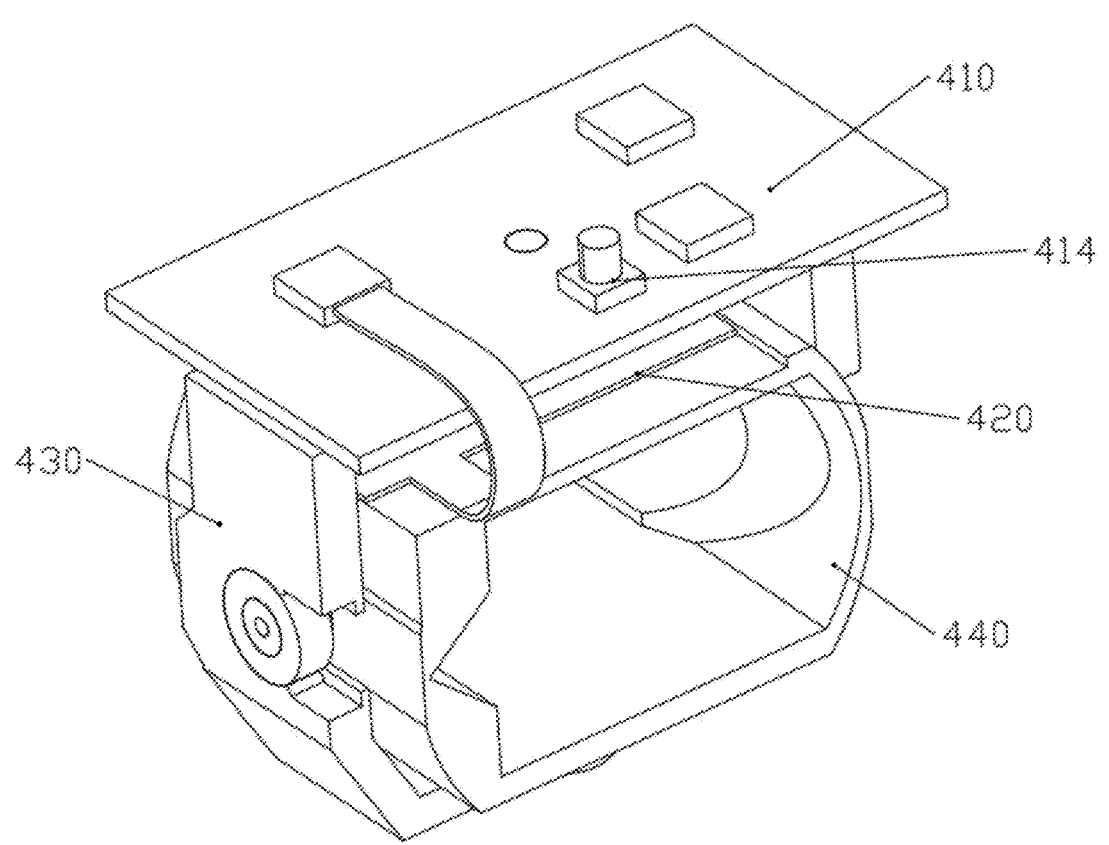
FIG. 3 illustrates a schematic structural view of a prism bracket of the telescope with the anti-shake mechanism of the disclosure.
Figure 4:
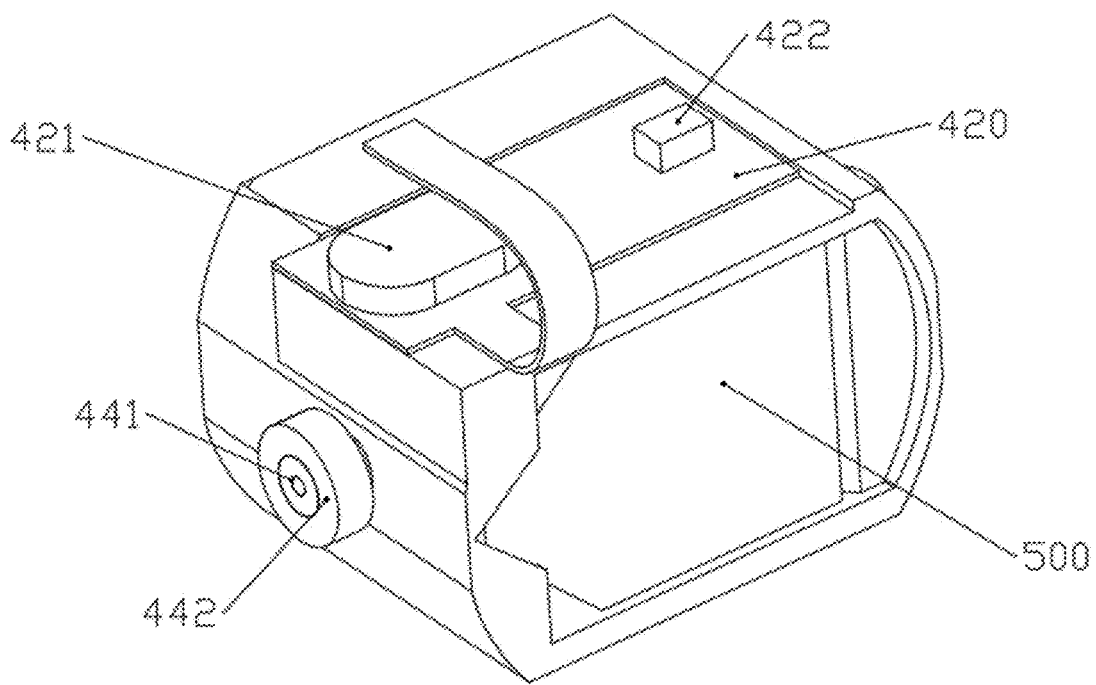
FIG. 4 illustrates a schematic structural view of an inner rotation frame of the telescope with the anti-shake mechanism of the disclosure.
Figure 5:
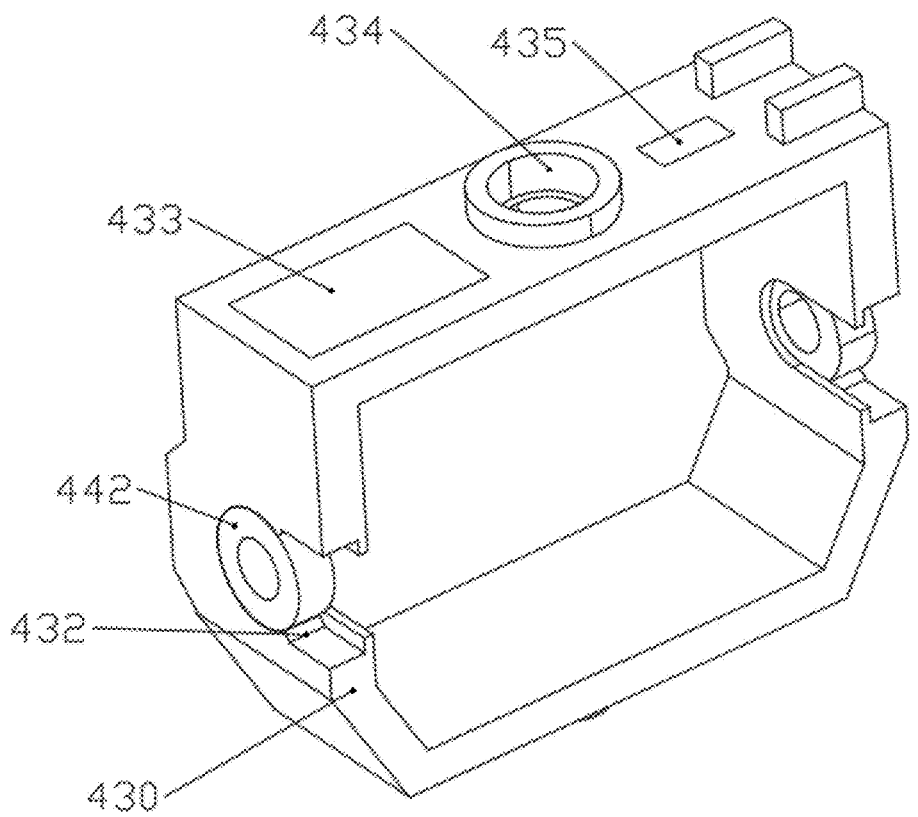
FIG. 5 illustrates a schematic structural view of a rotation frame of the telescope with the anti-shake mechanism of the disclosure.
Figure 6:
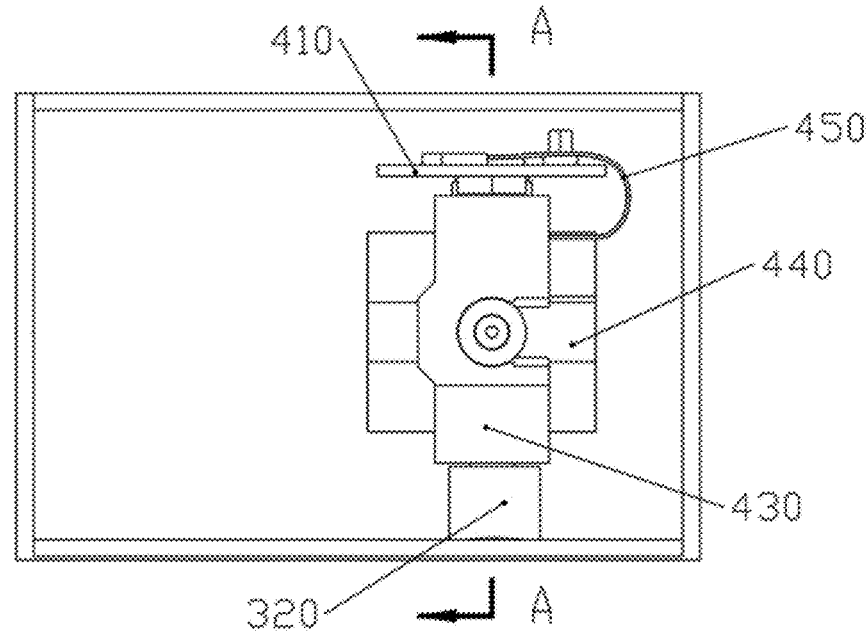
FIG. 6 illustrates a schematic structural view of an internal planar structure of the telescope with the anti-shake mechanism of the disclosure.
Figure 7:
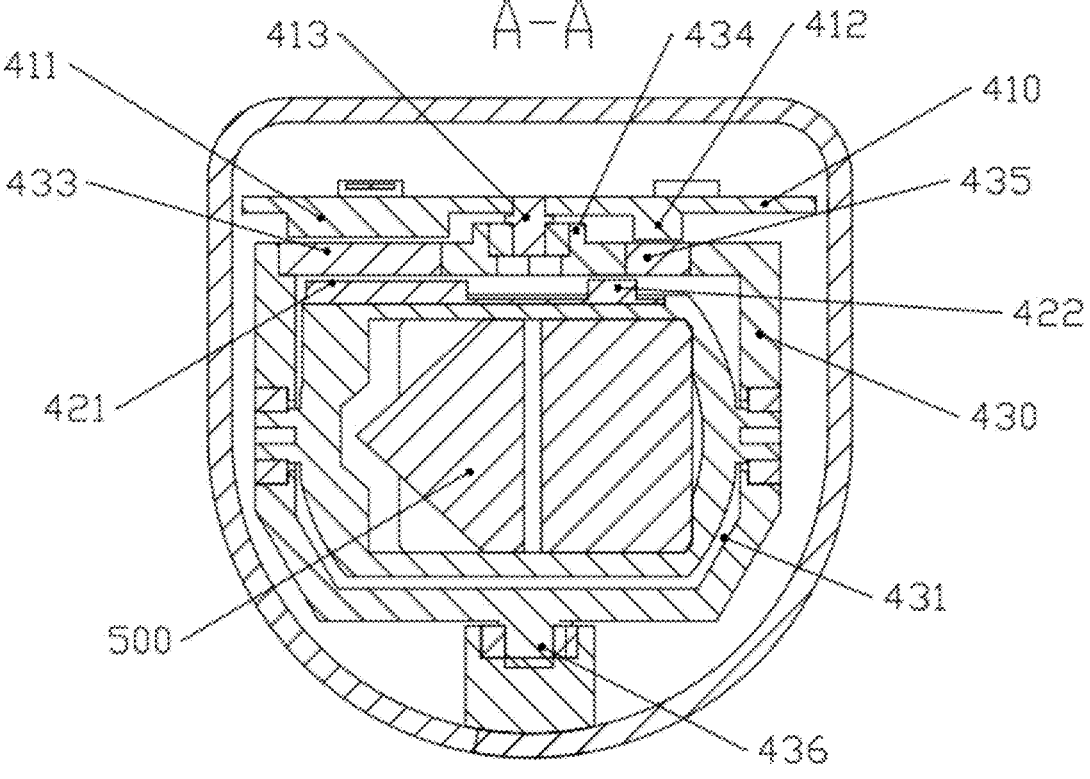
FIG. 7 illustrates a schematic sectional structural view of the telescope with the anti-shake mechanism of the disclosure along a line A-A illustrated in FIG. 6.

An embodiment of the disclosure provides a telescope with an anti-shake mechanism, as illustrated in FIG. 1-FIG. 7, the telescope with the anti-shake mechanism includes: an eyepiece 10, an objective lens 20, and a prism compartment 30 located between the eyepiece 10 and the objective lens 20. An interior of the prism compartment 30 is provided with a prism bracket 40 and a prism 500 mounted on the prism bracket 40.

The prism bracket 40 includes a rotation frame 430, an inner rotation frame 440 rotatably connected to the rotation frame 430, a control circuit board 410, and an inner shaft circuit board 420 located on the inner rotation frame 440. Bearing installation grooves 432 are defined on a side wall of the rotation frame 430. An outer side of the inner rotation frame 440 is provided with pitch shafts 441, and the pitch shafts 441 are provided with pitch bearings 442 respectively. Each pitch bearing 442 is engaged in each bearing installation groove 432. The rotation frame 430 and the inner rotation frame 440 can achieve rotatable connection with the help of the pitch bearings 442 and the pitch shafts 441. The inner rotation frame 440 is primarily used to adjust a pitch angle.

The control circuit board 410 is mounted on an inner wall of the prism compartment 30 and is arranged parallel to the inner shaft circuit board 420.

A rotation shaft 436 is disposed on the rotation frame 430, the rotation shaft 436 is assembled and connected to a supporting shaft mount 320 disposed within the prism compartment 30. A bearing assembled with the rotation shaft 436 is disposed within the supporting shaft mount 320. The supporting shaft mount 320 can be integrally formed with the prism compartment 30 or can be connected to the prism compartment 30 as a separate component (i.e., the supporting shaft mount 320 and the prism compartment 30 are separate structures). When the supporting shaft mount 320 and the prism compartment 30 are the separate structures, the supporting shaft mount 320 is fixedly connected to the prism compartment 30. At a top of the rotation frame 430, there is a bearing housing 434. A top shaft 413 is disposed on the control circuit board 410, the top shaft 434 fits into the bearing housing 434, allowing the rotation frame 430 to rotate horizontally within the prism compartment 30. A prism cavity 431 is defined in the inner rotation frame 440, the prism 500 is located in the prism cavity 431.

The telescope with the anti-shake mechanism further includes a sensing assembly and a driving assembly. The sensing assembly includes an outer Hall element 412 disposed on the control circuit board 410, a sensing magnetic steel 435 disposed on the rotation frame 430, and an inner Hall element 422 disposed on the inner shaft circuit board 420. The driving assembly includes an outer driving coil 411 on the control circuit board 410, a driving magnetic steel 433 disposed on the rotation frame 430, and an inner driving coil 421 disposed on the inner shaft circuit board 420.

Rotation directions of the rotation frame 430 and the inner rotation frame 440 are perpendicular to each other. The control circuit board 410 and the inner shaft circuit board 420 are connected by a flexible flat cable 450, establishing an electrical connection between the control circuit board 410 and the inner shaft circuit board 420. The control circuit board 410 is provided with a gyroscope 414. When the eyepiece 10 and the objective lens 20 shake during use, the inner rotation frame 440 and the rotation frame 430 adjust the prism 500 respectively through horizontal and pitch rotations to reduce shaking, and to offset a field-of-view shaking in a binocular caused by shaking, and to achieve image stabilization.

In an embodiment, the outer driving coil 411 and the driving magnetic steel 433 cooperate with each other to drive the rotation frame 430 to cause horizontal deflection. The driving magnetic steel 433 and inner driving coil 421 cooperate to drive the inner rotation frame 440 to cause pitch deflection. The outer Hall element 412, the sensing magnetic steel 435, and the inner Hall element 422 are arranged correspondingly. The outer Hall element 412 and the sensing magnetic steel 435 are configured to obtain a horizontal deflection angle of the rotation frame 430. The sensing magnetic steel 435 and the inner Hall element 422 are configured to obtain a pitch deflection angle of the inner rotation frame 440. After the gyroscope 414 returns information, the control circuit board 410 individually controls the outer driving coil 411 and the inner driving coil 421 to interact with the driving magnetic steel 433, so as to achieve rotation adjustments of the inner rotation frame 440 and rotation frame 430. The sensing assembly uses the outer Hall element 412, the inner Hall element 422 and the sensing magnetic steel 435 to obtain actual deflection angles of the rotation frame 430 and the inner rotation frame 440.

In an embodiment, the sensing assembly and the driving assembly respectively use an independent magnetic steel. By using the inner rotation frame 440 and the rotation frame 430 to adjust the prism 500 through horizontal rotations and pitch rotations respectively, the shaking can be reduced, mutual interferences of the signals can be minimized, an output noise of the Hall element can be reduced, and an anti-shake accuracy of a device can be improved.

In an alternative embodiment of the disclosure, the prism compartment 30 further includes a battery holder 310, the battery holder 310 is electrically connected to the control circuit board 410. The prism compartment is provided with a cover plate, the cover plate covers the battery holder 310. The cover plate is provided with a charging port configured to charge a lithium-battery inside the battery holder 310, and the charging port is also electrically connected to the control circuit board 410.

In an embodiment, the control circuit board 410 is assembled on the inner wall of the prism compartment 30 through bolt and stud structures. The top shaft 413 is located on a side of the control circuit board 410 near the inner shaft circuit board 420.

In an alternative embodiment of the disclosure, the prism 500 includes a roof prism and a half-pentaprism.

It should be noted that in the aforementioned embodiments, for a simple illustration, they are illustrated as a series of actions. However, those skilled in the art should be aware that the disclosure is not limited to the order of the illustrated actions. According to the disclosure, certain steps may be performed in a different order or simultaneously. In addition, those skilled in the art should also be aware that the embodiments illustrated in the specification are preferred embodiments, and the actions and modules involved are not necessarily essential to the disclosure.

The above embodiments are only used to illustrate the technical solutions of the disclosure and are not intended to limit the scope of the disclosure. Apparently, the illustrated embodiments are only a part of the embodiments of the disclosure, not all of the embodiments. Based on these embodiments, all other embodiments obtained by those skilled in the art without making inventive efforts fall within the scope of protection of the disclosure. Although the disclosure has been illustrated in detail with reference to the above-mentioned embodiments, those skilled in the art can still combine, add, delete, or make other adjustments to the features of each embodiment of the disclosure according to the situation without making creative labors, and without conflicts, in order to obtain other different technical solutions whose essence has not deviated from the concept of the disclosure. These technical solutions also fall within the scope of protection of the disclosure.

What is claimed is:

1. A telescope with an anti-shake mechanism, comprising: an eyepiece (10), an objective lens (20), and a prism compartment (30) positioned between the eyepiece (10) and the objective lens (20); an interior of the prism compartment (30) is provided with a prism bracket (40) and a prism (500) disposed on the prism bracket (40); wherein the prism bracket (40) comprises a rotation frame (430), an inner rotation frame (440) rotatably connected to the rotation frame (430), a control circuit board (410) and an inner shaft circuit board (420) disposed on the inner rotation frame (440); the rotation frame (430) is rotatably connected to a supporting shaft mount (320) disposed within the prism compartment (30); and the control circuit board (410) is electrically connected to the inner shaft circuit board (420);
a sensing assembly, wherein the sensing assembly comprises an outer Hall element (412) disposed on the control circuit board (410), a sensing magnetic steel (435) disposed on the rotation frame (430), and an inner Hall element (422) disposed on the inner shaft circuit board (420); and
a driving assembly, wherein the driving assembly comprises an outer driving coil (411) disposed on the control circuit board (410), a driving magnetic steel (433) disposed on the rotation frame (430), and an inner driving coil (421) disposed on the inner shaft circuit board (420).

2. The telescope with the anti-shake mechanism as claimed in claim 1, wherein a rotation shaft (436) is disposed on the rotation frame (430), the rotation shaft (436) is assembled and connected to the supporting shaft mount (320) within the prism compartment (30); a bearing housing (434) is disposed on a top of the rotation frame (430), a top shaft (413) is disposed on the control circuit board (410), and the top shaft (413) is assembled in the bearing housing (434).

3. The telescope with the anti-shake mechanism as claimed in claim 2, wherein bearing installation grooves (432) are defined on a side wall of the rotation frame (430), an outer side of the inner rotation frame (440) is provided with pitch shafts (441), the pitch shafts (441) are provided with pitch bearings (442) respectively, and each pitch bearing (442) is engaged in each bearing installation groove (432).

4. The telescope with the anti-shake mechanism as claimed in claim 3, wherein the outer driving coil (411) and the driving magnetic steel (433) cooperate with each other to drive the rotation frame (430) to cause horizontal deflection, and the driving magnetic steel (433) and the inner driving coil (421) cooperate with each other to drive the inner rotation frame (440) to cause pitch deflection.

5. The telescope with the anti-shake mechanism as claimed in claim 4, wherein the outer Hall element (412), the sensing magnetic steel (435), and the inner Hall element (422) are arranged correspondingly, the outer Hall element (412) and the sensing magnetic steel (435) are configured to obtain a horizontal deflection angle of the rotation frame (430), and the sensing magnetic steel (435) and the inner Hall element (422) are configured to obtain a pitch deflection angle of the inner rotation frame (440).

6. The telescope with the anti-shake mechanism as claimed in claim 5, wherein rotation directions of the rotation frame (430) and the inner rotation frame (440) are perpendicular to each other.

7. The telescope with the anti-shake mechanism as claimed in claim 6, wherein the control circuit board (410) is provided with a gyroscope (414).

8. The telescope with the anti-shake mechanism as claimed in claim 7, wherein the inner rotation frame (440) is defined with a prism cavity (431), and the prism (500) is disposed within the prism cavity (431).

9. The telescope with the anti-shake mechanism as claimed in claim 8, wherein the control circuit board (410) and the inner shaft circuit board (420) are connected by a flexible flat cable (450).

10. The telescope with the anti-shake mechanism as claimed in claim 9, wherein a battery holder (310) is disposed within the prism compartment (30), and the battery holder (310) is electrically connected to the control circuit board (410).

\* \* \* \* \*